March 14, 1939. A. H. CARSON ET AL 2,150,539
HYDRAULIC POWER TRANSMITTING APPARATUS
Filed Sept. 30, 1935 3 Sheets-Sheet 1
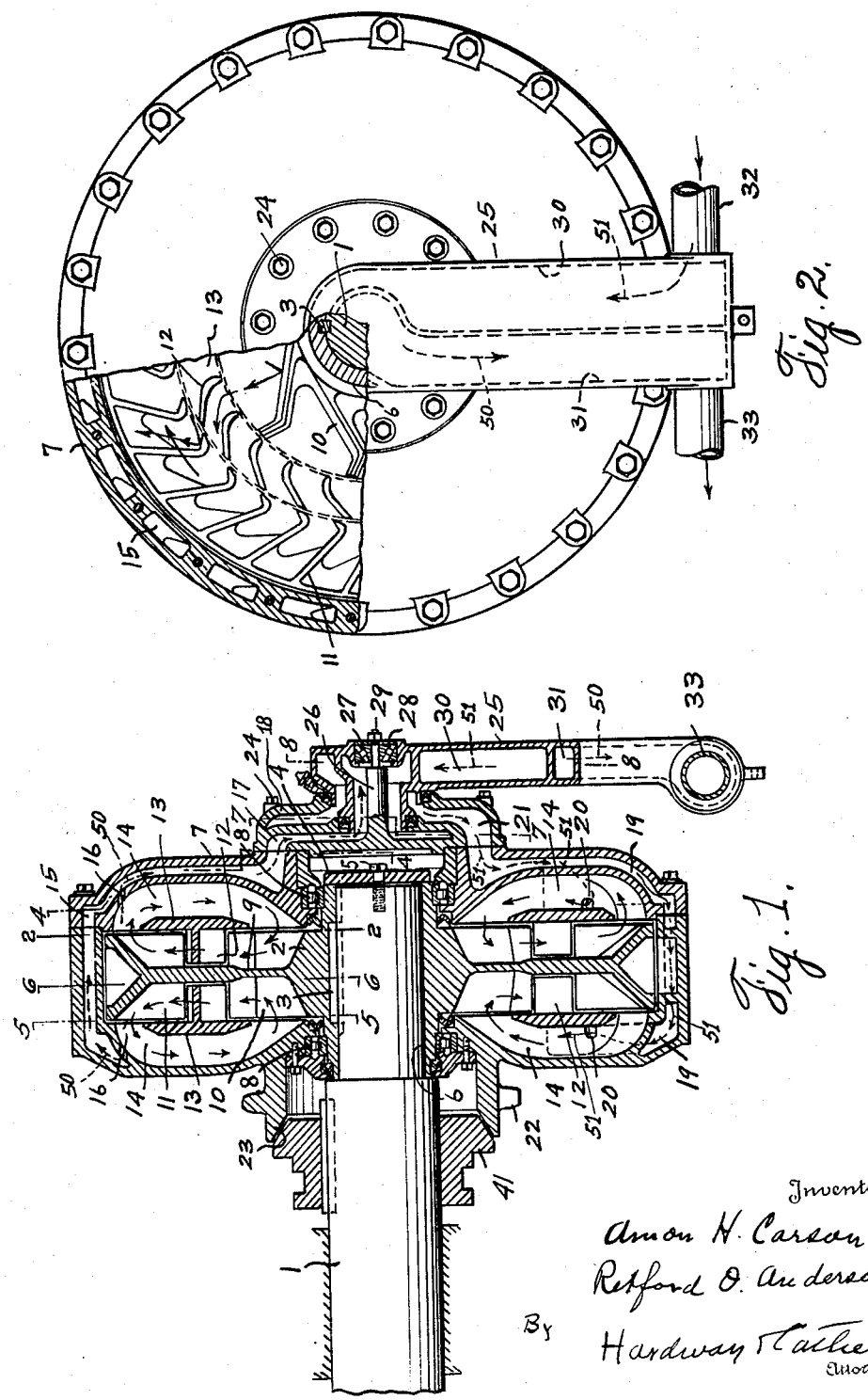

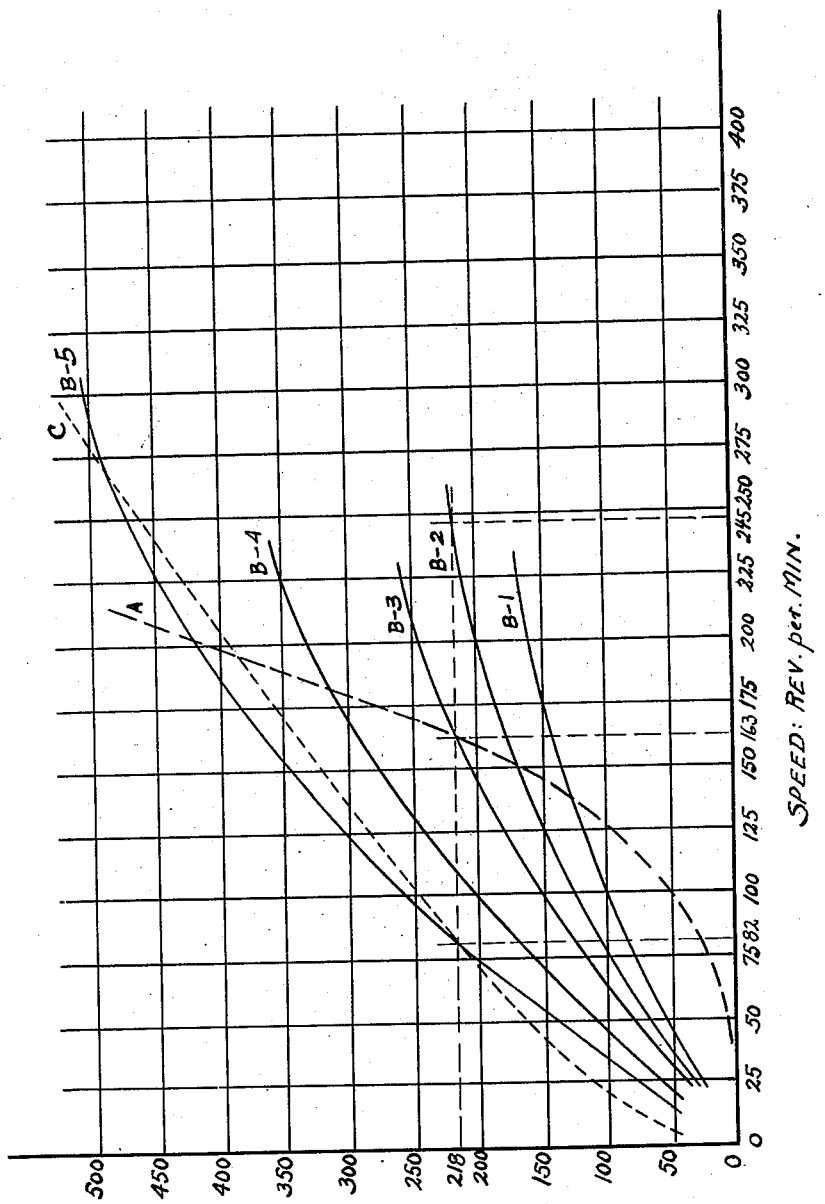

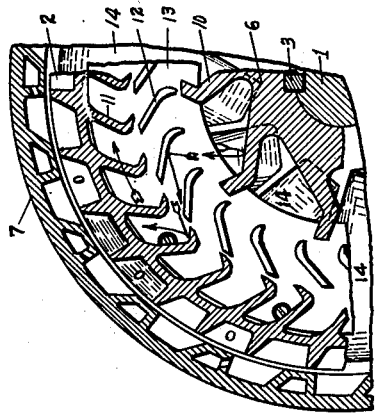

Patented Mar. 14, 1939

2,150,539

UNITED STATES PATENT OFFICE 2,150,539

HYDRAULIC POWER TRANSMITTING APPARATUS

Amon H. Carson and Rexford O. Anderson, Oklahoma City, Okla.

Application September 30, 1935, Serial No. 42,871

12 Claims. (Cl. 60—54)

This invention relates to a hydraulic power transmitting apparatus.

An object of the invention is to provide hydraulic power transmitting apparatus embodying a hydraulic clutch and speed reduction equipment specially designed for use on hoists, power shovels, elevators, conveyors, trucks, tractors, and similar types of machinery embodying power transmission equipment.

The clutch equipment in general use for power transmission usually involves the use of mechanical friction between a power driven surface constituting a driving element and a cooperating surface forming part of the driven element, such as the common friction clutch of the cone or disk type. This equipment is subject to destructive effects due to excessive heat and abrasive wear especially where the initial loads are heavy. In such cases the clutch friction surfaces are required to absorb the work necessary to overcome the inertia of the initial load and bring its speed up to a point approaching that of the prime mover at the time the load was first engaged. This condition is common to the duties of heavy trucks, tractors, steam shovels, drag line ditching equipment, excavating equipment, hoist and elevating equipment of all types. It is necessary in this type of equipment to have prime movers of a power far in excess to that necessary to handle the normal load in motion. This results in the necessity of providing massive and expensive equipment such as would not be necessary in equipment utilizing the principle and design of the invention hereinafter disclosed.

The speed reduction equipment commonly used in power transmission for the purpose of synchronizing the speeds of the prime mover and the driven unit to correspond to the power generated and utilized, respectively, consists of belts and pulleys, sprockets and chains, friction drives and gearing of all types. The use of these types requires bulky and expensive equipment and limits the speed of the driven unit to predetermined ratios of that of the prime mover regardless to the conditions that later arise in the operation of the unit. Such equipment also limits the utilization of power in the case of constant speed prime movers.

Our invention includes a machine consisting of a rotor adapted to rotate inside of a shell in the presence of and surrounded by a fluid such as water, or oil. The rotor has incorporated in it radially directioned impeller vanes about its center and radially directioned vanes at its outer periphery and located between these two sets of vanes are deflecting vanes forming a part of the shell. In principle of operation, power is transmitted from the rotor, which is driven by a prime mover, to the shell by means of kinetic energy which is transmitted to the liquid in the shell by the rotor in the form of velocity, and by dissipating this kinetic energy on the shell surfaces, thus transmitting the energy from the rotor to the shell and to the driven unit to which the shell is connected by a positive driving means such as shafting, gears, sprocket and chain, and the like. In transmitting the energy in this manner with no abrasive surfaces in contact, there is no wear of the transmitting parts. Part of the energy transmitted is transformed into heat which raises the temperature of the water and consequently means have been provided for introducing cool water, or other liquid, to displace an equal amount of that in the shell which has become heated and the temperature of the transmitting liquid is thus kept within reasonable limits. The power transmitted from the rotor to the shell varies approximately as the cube of the relative speed of rotation of the two. This allows the prime mover to start the rotor with no torque load. Its speed can become relatively high before it is subjected to any torque load, thus allowing the power of the rotor to equal that of the load without administering shocks through sudden overloads, as in the case of the common friction clutch. The velocity of rotation of the shell and driven unit can be readily controlled by controlling the speed of the prime mover, the different speeds of the two depending on the load being handled. This characteristic allows a hydraulic power transmission of simplicity and complete speed flexibility not common to mechanical transmission.

The relative speed-power transmission power characteristic allows the utilization of the apparatus as a brake in lowering the load as in the instance of a hoist. When the apparatus is used in this connection, the speed of the prime mover may be reduced below the relative rotor and shell speed necessary to transmit power sufficient to hold the load at which time the load tends to be lowered by gravity, and by rotating the shell in the reverse direction while the prime mover continues to rotate in the same direction to affect the elevation of the load. This eliminates the wear and heat destruction of parts common to friction brakes.

With the above and other objects in view, the invention has particular relation to certain novel features of construction, operation, and arrangement of parts, an example of which is given in this specification and illustrated in the accompanying drawings, wherein:

Fig. 1 shows a vertical sectional view of the hydraulic clutch employed.

Fig. 2 shows an end view, partly in section, taken on the line 2—2 of Fig. 1.

Fig. 3 shows a characteristic work chart delineating the relative results of the invention as utilized in the various transmission systems.

Figure 4 shows a fragmentary sectional view taken on the line 4—4 of Figure 1,

Figure 5 shows a fragmentary sectional view taken on the line 5—5 of Figure 1,

Figure 6 shows a fragmentary sectional view taken on the line 6—6 of Figure 1,

Figure 7 shows a fragmentary sectional view taken on the line 7—7 of Figure 1, and Figure 8 shows a fragmentary sectional view taken on the line 8—8 of Figure 1.

Referring now more particularly to the drawings, wherein like numerals of reference designate similar parts in each of the figures, the numeral 1 designates a power transmitting shaft whereon the rotor 2 is rigidly mounted, preferably by means of a key, as 3, the retaining plate 4 and the cap screw 5. Rotatably mounted on the rotor hub 6 and enclosing the rotor is the shell 7 which is supported on the bearings 8. The rotor 2 is composed of the hub 6, the radial web 9, fixed on said hub, the radially directed impeller blades 10, and the radially directed impeller vanes 11 whose outer ends are extended obliquely to the web of the rotor. The shell 7 contains the baffle blades 12 fixed on the flat rings 13 and located between the rotor impeller vanes 10, 11. The inner surface of the shell is contoured to form the channels 14 which extend from the outer circumferences of the shell toward the center of the shell and toward the rotor hub 6. Incorporated into the shell 7, there are also the radially disposed circulating water outlet ports 15 which are connected at one end by the holes 16 to the channels 14, and at their other ends to the ducts 17 of the water header 18 which header is fixed to the shell by means of the bolts 24. Also incorporated into the shell there are the radially disposed circulating water inlet ducts 19, the outer ends of which are connected to the channels 14, by means of the openings 20 and at their other ends to the inlet channel 21 of the header. Also there is a sprocket 22 fixed to the shell forming a power transmission means.

The apparatus shown in Figs. 1 and 2 also embody a friction clutch member 23 adapted to be utilized in certain types of transmission systems.

Rotatably mounted on the water header 18 is the circulating water manifold 25 which is supported on the header trunnion 26 by the bearing 27 and which is held axially by the washer 28 and the bolt 29.

The water manifold contains the inlet channel 30 which is connected with the header inlet channel 21.

In operation water is fed into the apparatus through the inlet pipe 32, as designated by the broken line arrows 51, until the space in the shell and surrounding the rotor is completely filled. The rotor is started turning in the direction indicated by the arrow, Fig. 2. The load tends to hold the shell stationary. The impeller vanes 10 force the water in a tangential direction in proportion to the speed of the rotor and the contour of the vane surfaces, storing a proportionate amount of kinetic energy in the water. The water, after traveling past the ends of the rotor impeller vanes impinges upon the faces of the baffle vanes 12 transmitting a part of its kinetic energy to said vanes 12 tending to cause the shell 7 to rotate in the direction of the rotation of the rotor. The baffle vanes 12 are so set as to change the direction of the water partially in a direction opposite to that of rotation, and radially. The water then passes out into the rotor impeller vanes 11 whose inner ends incline in the direction of rotation and act to draw the energy spent water from the baffle vanes 12 and give it high velocity in a radial direction proportionate to their peripheral speed and contour. The central faces of the impeller vanes 11 are inclined in the direction of rotation and tend to change direction of the water from a radial to a tangential direction without materially decreasing its velocity. The outer faces of the impeller vanes 11 are inclined obliquely to the rotor web 9 and impel the water in a lateral and tangential direction into the shell channels 14 with a velocity proportionate to the peripheral velocity and contour of the surfaces.

The kinetic energy in the water thus expelled from the rotor is spent partially on the shell channel walls tending to further cause the shell to rotate in the direction of rotation of the rotor. The energy not spent against the shell walls carries the water back toward the center of the shell and the inlet of the rotor impeller 10 which again engages the water and the cycle is again repeated.

A portion of the energy generated is transformed into heat and raises the temperature of the water being circulated through the clutch. In order to expel this heat and keep down the water temperature within reasonable limits, a portion of the heated water is constantly expelled through the outlet openings 16 which are located directly in the path of the water. This hot water travels through the channels 15 and 17 and thence out through the manifold 31 and into the discharge pipe 33 as designated by broken arrows 50. Fresh water of equal volume is simultaneously introduced through the pipe 32 and through the channel of the manifold 30, passing thence through the channel 21 of the header and through the shell inlet channel 19 and passing thence through the openings 20 located at a point of low pressure in the channels 14 as designated by broken arrows 51.

It has been demonstrated by actual experimentation that the power transmitted from the rotor to the shell varies directly, approximately as the cube of the relative speeds of rotation of the rotor and shell vary as shown by curve "A", Figure 3. This allows the rotor to obtain comparatively high speeds before being subjected to heavy loads through the action of water on the shell. As the speed of the rotor increases the power transmitted to the shell gradually increases until the torque on the shell is sufficient to balance that to which it is subjected by the initial torque load to be handled. Further increase in speed of the rotor then transmits power to the shell sufficient to overcome the initial torque load and the movement of the load is started and performed without shock to the prime mover.

Assuming, for example, that a steam engine is used as a prime mover and the curves B—1, B—2, B—3, B—4, and B—5, Fig. 3, represents the power at different speeds using steam pressure of 100, 125, 150, 200, and 250 pounds, respectively, per square inch in the cylinders. Curve C, Fig. 3, represents the load to be handled at speeds corresponding to that of an engine connected to shaft 1 and the hydraulic clutch shown in Figs. 1 and 2. It is to be noted that up to speeds of 82 R. P. M. the engine would require more than 250 pounds pressure, which is the normal maximum working pressure of the engine. If the engine were directly connected to a load, this would require it to withstand terrific shock loads to start the load moving. However, with the hydraulic transmission being used, the engine will start with no perceptible load and at 100 R. P. M., it would have a load of 50 H. P. running with about 50 pounds of steam pressure. When the engine is developing 218 H. P., at which point the engine directly connected to the load could handle it with 250 pounds of steam pressure at 82 R. P. M., the hydraulic transmission could develop the 218 H. P. with a differential speed of 163 R. P. M. between the shell 7 and the prime mover. Therefore, in order for the load to be moved at 82 R. P. M., the engine should be speeded to 82 R. P. M. plus 163 R. P. M., or a total of 245 R. P. M., at which speed it would require only 125 pounds steam pressure in the cylinders. This makes possible the use of a much smaller engine at a great saving in the cost of power. In case of a hoist-type of equipment where the load is lowered by gravity, when the load has been raised to its peak, the engine would be slowed down to 163 R. P. M., where the differential speed of the shell would hold the load suspended at rest. To lower the load, the engine speed should be further reduced, say to 150 R. P. M., which would allow the load to be lowered 163 R. P. M. minus 150 R. P. M., or 13 R. P. M. In this way the load can be lowered to any speed desirable.

It is obvious that the invention is subject to mechanical variations and while the drawings and description disclose what we now consider to be a preferred form and adaptation of the invention it is to be understood that they are illustrative only and that the broad principle of the invention will be defined by the appended claims.

What we claim is:

1. A hydraulic power transmitting device comprising a shell for containing a liquid, a rotor mounted for relative rotation with said shell, liquid in the shell, baffle vanes, having inward radially directed impelling surfaces, carried by the shell, impellers having angularly related plane surfaces and carried by the rotor, said impellers and said baffle vanes being arranged to co-act to impel flow of the liquid outwardly and inwardly, respectively, upon the relative rotation of said rotor and shell to transmit energy between them, said device having induction and expulsion passageways for the liquid.

2. A power transmitting device comprising two adjacent parts relatively rotatable about a common axis and forming a chamber between them for containing a liquid, one of said parts forming a driving rotor, a series of fixed impeller vanes on the rotor adjacent and tangential to its center to effect outward displacement of liquid upon rotation, another series of impeller vanes fixed on and adjacent to the periphery of, the rotor and the inner ends of which are formed tangential to the center of the rotor to effect outward displacement of the liquid and the outer ends of which are formed tangential to the center of the rotor and also at an angle with the plane of rotation of the rotor to effect an inward and longitudinal displacement of the liquid upon rotation, the other said part forming a liquid driven member having a series of fixed turbine blades thereon and spaced concentric with the axis of rotation and spaced radially between the said series of rotor impellers, and another series of turbine blades, the outer ends of which are longitudinally adjacent the periphery of the said rotor and are formed in contours varying from concentric with the axis of rotation and at varying angles with the plane of rotation to approximately radial at the center at their inner diameter, which is longitudinally adjacent the rotor inner series of impeller blades, liquid in the chamber, said liquid being effective to coact with said impeller vanes, upon rotation of the rotor, to transmit energy from the rotor to said blades and the liquid driven member.

3. A power transmitting device comprising two adjacent parts relatively rotatable about a common axis and forming a chamber between them for containing a liquid, one of said parts forming a driving rotor, a series of fixed impeller vanes on the rotor adjacent and tangential to its center to effect outward displacement of liquid upon rotation, another series of impeller vanes fixed on and adjacent to the periphery of the rotor and the inner ends of which are formed tangential to the center of the rotor to effect outward displacement of the liquid and the outer ends of which are formed tangential to the center of the rotor and also at an angle with the plane of rotation of the rotor to effect an inward and longitudinal displacement of the liquid upon rotation, the other of said parts forming a liquid driven member having a series of fixed turbine blades thereon and spaced concentric with the axis of rotation and spaced radially between the said series of rotor impellers, and another series of turbine blades, the outer ends of which are longitudinally adjacent the periphery of the said rotor and are formed in contours varying from concentric with the axis of rotation and at varying angles with the plane of rotation to approximately radial at the center at their inner diameter, which is longitudinally adjacent the rotor inner series of impeller vanes, liquid in the chamber, there being passageways in said members for the introduction and expulsion of said liquid, said liquid being effective to coact with the impeller vanes, upon rotation of the rotor, to transmit energy from the rotor to said blades and the liquid driven member.

4. A hydraulic power transmitting device comprising two parts one of which is a rotatable shell for containing a liquid, a rotor mounted for relative rotation with said shell, liquid in the shell, baffle vanes having tubular channels and carried by the shell, impeller blades carried by the rotor, said impeller blades and baffle vanes being arranged to coact to impel circulation of the liquid upon relative rotation of said rotor and shell, to transmit energy between said rotor and shell, said vanes, channels and blades forming means for creating high pressure areas for expulsion of a portion of the liquid and low pressure areas in the liquid stream for the induction of liquid into the device, stationary means appended to the exterior of the shell and having conduits for conveying the said expelled and induced liquid from and to the device while the shell and rotor are relatively rotated, regulatory means for controlling the induction of said liquid in the device to control the amount of energy transmitted.

5. A power transmitting device comprising two adjacent parts relatively rotatable about a substantially common axis and forming a chamber between them for containing a liquid one of said parts forming a driving rotor, fixed impelling elements on the rotor adjacent and tangential to its center to effect outward displacement of liquid upon rotation and also adjacent to the periphery of the rotor the outer ends of which are formed tangential to the center of the rotor and also at an angle with the plane of rotation of the rotor to effect an inward and longitudinal displacement of the liquid upon rotation, the other of said parts forming a liquid driven member having a series of turbine blades, the outer ends of which are longitudinally adjacent the periphery of said rotor and are formed in contours varying from concentric with the axis of rotation and at varying angles with the plane of rotation to approximately radial at the center at their inner diameter, which is longitudinally adjacent the inner ends of the rotor impellers, liquid in the chamber, said liquid being effective to co-act with the impellers, upon rotation of the rotor to transmit energy from the rotor to said liquid driven member.

6. A power transmitting device comprising two adjacent parts relatively rotatable about a substantially common axis and forming a chamber between them for containing a liquid, one of said parts forming a driving rotor, a series of fixed impeller vanes on the rotor adjacent and tangential to its center to effect outward displacement of liquid upon rotation and also adjacent to the periphery of the rotor the outer ends of which are formed tangential to the center of the rotor and also at an angle with the plane of rotation of the rotor to effect an inward and longitudinal displacement of the liquid upon rotation, the other of said parts forming a liquid driven member and having a series of turbine blades the outer ends of which are longitudinally adacent the periphery of said rotor and are formed in contours varying from concentric with the axis of rotation and at varying angles with the plane of rotation to approximately radial at the center at their inner diameter which is longitudinally adjacent the rotor impelling vanes, liquid in the chamber, there being passageways in said members for the introduction and expulsion of said liquid, said liquid being effective to co-act with the impeller vanes, upon rotation of the rotor, to transmit energy from the rotor to the fluid driven member.

7. A power transmitting device comprising two adjacent parts relatively rotatable about a common axis, and forming a chamber between them for containing a liquid, one of said parts forming a driving rotor, a series of fixed impelling means on the rotor adjacent the hub and substantially tangential to the axis of rotation, the impelling means having angularly related plane surfaces and whose inner ends are effective to cause an outward radial displacement of liquid and whose outer ends are formed tangential to the center of the rotor and also at an angle with the plane of rotation of the rotor to effect an inward and longitudinal displacement of the liquid upon rotation, the other part forming a liquid driven member having a series of fixed turbine blades thereon spaced concentric with the axis of rotation, the outer ends of said turbine blades being longitudinally adjacent the periphery of said rotor and being formed in contours varying from concentric with the axis of rotation and at varying angles with the plane of rotation to approximately radial at the center at their inner diameter, which is longitudinally adjacent the inner diameter of the rotor impelling means, liquid in the chamber, said liquid being effective to coact with the impelling means, upon rotation of the rotor, to transmit energy from the rotor to said fluid driven member.

8. A power transmitting device comprising two adjacent parts relatively rotatable about a common axis, and forming a chamber between them for containing a liquid, one of said parts forming a driving rotor, a series of fixed impelling means on the rotor adjacent the hub and substantially tangential to the axis of rotation, the impelling means having angularly related plane surfaces and whose inner ends are effective to cause an outward radial displacement of liquid and whose outer ends are formed tangential to the center of the rotor and also at an angle with the plane of rotation of the rotor to effect an inward and longitudinal displacement of the liquid upon rotation, the other part forming a liquid driven member having a series of fixed turbine blades thereon spaced concentric with the axis of rotation, the outer ends of said turbine blades being longitudinally adjacent the periphery of said rotor and being formed in contours varying from concentric with the axis of rotation and at varying angles with the plane of rotation to approximately radial at the center at their inner diameter, which is longitudinally adjacent the inner diameter of the rotor impelling means, liquid in the chamber, said liquid being effective to coact with the impelling means, upon rotation of the rotor, to transmit energy from the rotor to said fluid driven member, there being passageways in said members for the introduction and expulsion of liquid into and out of said chamber.

9. A hydraulic power transmitting device comprising a shell for containing a liquid, and a rotor for relative rotation within the shell, said rotor containing a series of inner impellers, arranged to displace liquid outwardly upon rotation, and outer series of impellers having intersecting plane impelling surfaces, the inner surfaces being arranged to displace liquid radially outwardly and the outer surfaces being arranged to displace liquid laterally upon rotation, baffle vanes carried on the shell in staggered relation with said impellers, liquid in the shell, the impellers, the liquid and the baffle vanes being arranged to co-act to transmit energy between the rotor and shell upon the relative rotation of same.

10. A hydraulic power transmitting device comprising a shell for containing a liquid, a rotor mounted for relative rotation with said shell, liquid in the shell, impellers having intersecting plane impelling surfaces carried by the rotor, baffle vanes having varied angular related surfaces with components radially contra-directioned to those of the co-acting impeller upon rotation, the impellers, liquid, and baffles arranged to co-act upon rotation of the rotor to transmit energy from said rotor to said shell.

11. A power transmitting device comprising two adjacent parts relatively rotatable about a substantially common axis, and forming a chamber between them for containing a liquid, one of said parts forming a driving rotor, fixed impelling elements on the rotor adjacent its center to effect outward displacement of liquid upon rotation, and also having impelling elements adjacent the periphery of the rotor, the outer ends of the outer impelling elements being formed normal to the center and also at an angle with the plane of rotation of the rotor to effect a longitudinal displacement of the liquid upon rotation, the other of said parts forming a liquid driven member having a series of turbine blades, the outer ends of which are longitudinally adjacent the periphery of said rotor, and are formed in contours varying from approximately concentric with the axis of rotation and at varying angles to the plane of rotation of said rotor to approximately radial at their inner diameter which is longitudinally adjacent the inner ends of the rotor impellers, liquid in the chamber, said liquid being effective to co-act with the impelling elements upon rotation of the rotor to transmit energy from the rotor to said liquid driven member.

12. A power transmitting device comprising two adjacent parts relatively rotatable about a substantially common axis and forming a chamber between them for containing a liquid, one of said parts forming a driving rotor, a series of fixed impeller vanes on the rotor adjacent its center shaped to effect outward displacement of the liquid upon rotation, another series of impeller vanes fixed on and adjacent the periphery of the rotor and the inner ends of which are related to the center of the rotor to effect outward displacement of the liquid, and the outer ends of which are formed approximately radial to the axis, and also at an angle to the plane of rotation of the rotor to effect a longitudinal displacement of the liquid upon rotation, the other part forming a liquid driven member having a series of fixed turbine blades thereon and spaced radially between said series of rotor impeller vanes, and another series of turbine blades, the outer ends of which are longitudinally adjacent the periphery of said rotor and are formed in contours varying from approximately concentric with the axis of rotation and at varying angles with the plane of rotation to radial at their inner diameter, which is longitudinally adjacent the rotor inner series of impeller blades, liquid in the chamber, said liquid being effective to co-act with said impeller vanes, upon rotation of the rotor, to transmit energy from the rotor to said blades and the liquid driven member.

AMON H. CARSON.
REXFORD O. ANDERSON.